Dec. 6, 1938.  E. A. FREDRICKSON  2,139,361
STOPPER FOR USE IN THE CONVENTIONAL MANNER WITH
LAVATORIES, BATHTUBS, AND THE LIKE
Filed Dec. 14, 1936
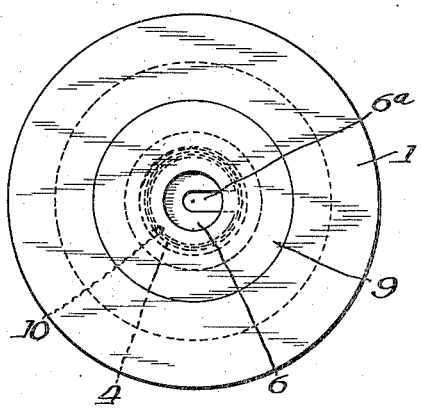
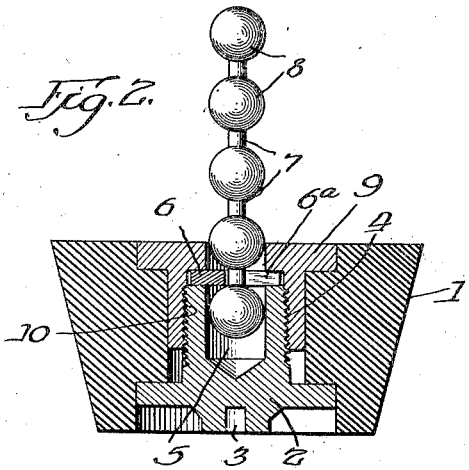
Inventor:
Edward A. Fredrickson
By: Joseph O. Lange
Atty.

Patented Dec. 6, 1938

2,139,361

UNITED STATES PATENT OFFICE 2,139,361

STOPPER FOR USE IN THE CONVENTIONAL MANNER WITH LAVATORIES, BATHTUBS, AND THE LIKE

Edward A. Fredrickson, Chicago, Ill., assignor to Crane Co., Chicago, Ill., a corporation of Illinois Application December 14, 1936, Serial No. 115,657

1 Claim. (Cl. 4—295)

More particularly, my invention relates to a sturdily constructed improved stopper preferably employing for its connection to the lavatory and the like a readily removable and easily renewable chain. Thus, in the event that an end link of the chain, during the course of usage or through accident, becomes severed, the immediate preceding link may be substituted therefor without need for using a new chain.

One of the more important objects is to provide for a relatively simple and inexpensive arrangement for a replaceable stopper core or the chain therefor or both.

Another important object of my invention is to provide for a device which in its assembly is not only pleasing in appearance to the eye but also provides one which is easy to clean and which renders itself susceptible to continued sanitary maintenance in having a minimum of dirt collecting corners and crevices.

Other objects and advantages will become apparent upon proceeding with the specification in connection with the drawing, in which Fig. 1 is a plan elevation of an improved type of stopper employing features of my invention.

Fig. 2 is a sectional view showing the stopper in assembled relation with the conventional type of beaded chain for the purpose of attachment to the fixture with which it may be employed and also for withdrawing it from the drain outlet opening therewithin.

Fig. 3 is a plan elevation of a preferred form of slotted washer useful in effecting the locking connection between the stopper and the chain.

Similar reference characters refer to similar parts in the various views.

Referring to Fig. 2, a conventional tapered stopper 1 is illustrated which may be made either of rubber, composition and the like, depending upon the service intended, and which preferably has its lower portion recessed as shown to accommodate the flanged screw 2 having a screw driver slot 3 for the purpose hereinafter described and provided with the male screw threads 4. As indicated, the screw 2 is provided with a hollow portion or chamber 5 for the purpose of accommodating the inserted end link of the chain to be used. Preferably held nonrotatably at the end limits of the chamber 5, and exteriorly thereof, a flat circular washer 6 having a radially extending slot 6a is positioned, the slot 6a being preferably of such width so as to permit the transverse insertion of the connecting link 7 of the beaded chain 8. The plug 9 having the female threads 10 provides the necessary means for effecting a secure connection for the interposition of the washer 6 between the end of the screw 2 and the threaded bushing 9. In order to assist in making a rapid and effective assembly between the threads 4 and 10 respectively, of the latter mentioned members, the screw driver slot 3 is used for rotating the threaded member 2. Obviously the arrangement or type of threads employed upon the complementary members 2 and 9 may be reversed without impairing the effectiveness of the construction, and obviously other forms of interlocking means aside from the threads shown may be used to connect the said complementary members.

From the foregoing description it will be evident that a new, economical and effective means has been accomplished for the purpose of obtaining easy renewability should the end link of the beaded chain break. Likewise if the outer core 1 becomes worn or deteriorated during the course of service, it may be easily renewed without resorting to the expense of a completely new stopper by the simple expedient of disassembling the respective complementary members 2 and 9. Further, while the chain illustrated is of the beaded type, any other type of chain may of course be used which permits of similar link replacement being made in the event of severance.

The construction illustrated and described is capable of employing numerous modifications without departing from the spirit of the invention, and it is desired, therefore, that the extent of this invention be measured only by the scope of the claim appended hereto.

I claim:

A stopper and ball chain combination of the character described, having separable interlocking means comprising a hollow screw and an apertured bushing in complementary relation, removable flat washer-like fastening means having a radially extending slotted opening, a ball of the said chain normally positioned within the aperture of the said bushing and supportable upon an upper surface of the said washer-like fastening means, the said fastening means being non-rotatably positioned between said interlocking means, the said interlocking means providing means for guiding and containing the end portions of the said chain.

EDWARD A. FREDRICKSON.